United States Patent [19]

Golke et al.

[11] Patent Number: 4,457,308

[45] Date of Patent: Jul. 3, 1984

[54] PLASTICALLY DEFORMABLE COOLING AGENT

[75] Inventors: Heinz Golke, Breischeid; Wolfgang Volker, Tonisvorst; Andreas Donnerback, Krefeld, all of Fed. Rep. of Geremany

[73] Assignee: Messer Griesheim GmbH, Frankfurt am Main, Fed. Rep. of Germany

[21] Appl. No.: 417,055

[22] Filed: Sep. 13, 1982

[30] Foreign Application Priority Data

Dec. 5, 1981 [DE] Fed. Rep. of Germany ........ 3148262

[51] Int. Cl.³ ................................................ A61F 7/00
[52] U.S. Cl. .......................... 128/399; 128/DIG. 27; 62/529; 252/67; 252/70

[58] Field of Search ................................. 128/399–403, 128/DIG. 27; 252/70, 67; 62/259.3, 293, 529, 530; 220/901

[56] References Cited

U.S. PATENT DOCUMENTS 3,736,769 6/1973 Peterson ............................. 128/402
4,074,717 2/1978 Schulze et al. ....................... 62/293

Primary Examiner—Edward M. Coven
Assistant Examiner—Max F. Hindenburg
Attorney, Agent, or Firm—Connolly and Hutz

[57] ABSTRACT

A plastically deformable cooling agent consists of a mixture of liquid nitrogen with at least 8% by weight of fine-grained silica gel.

4 Claims, 2 Drawing Figures

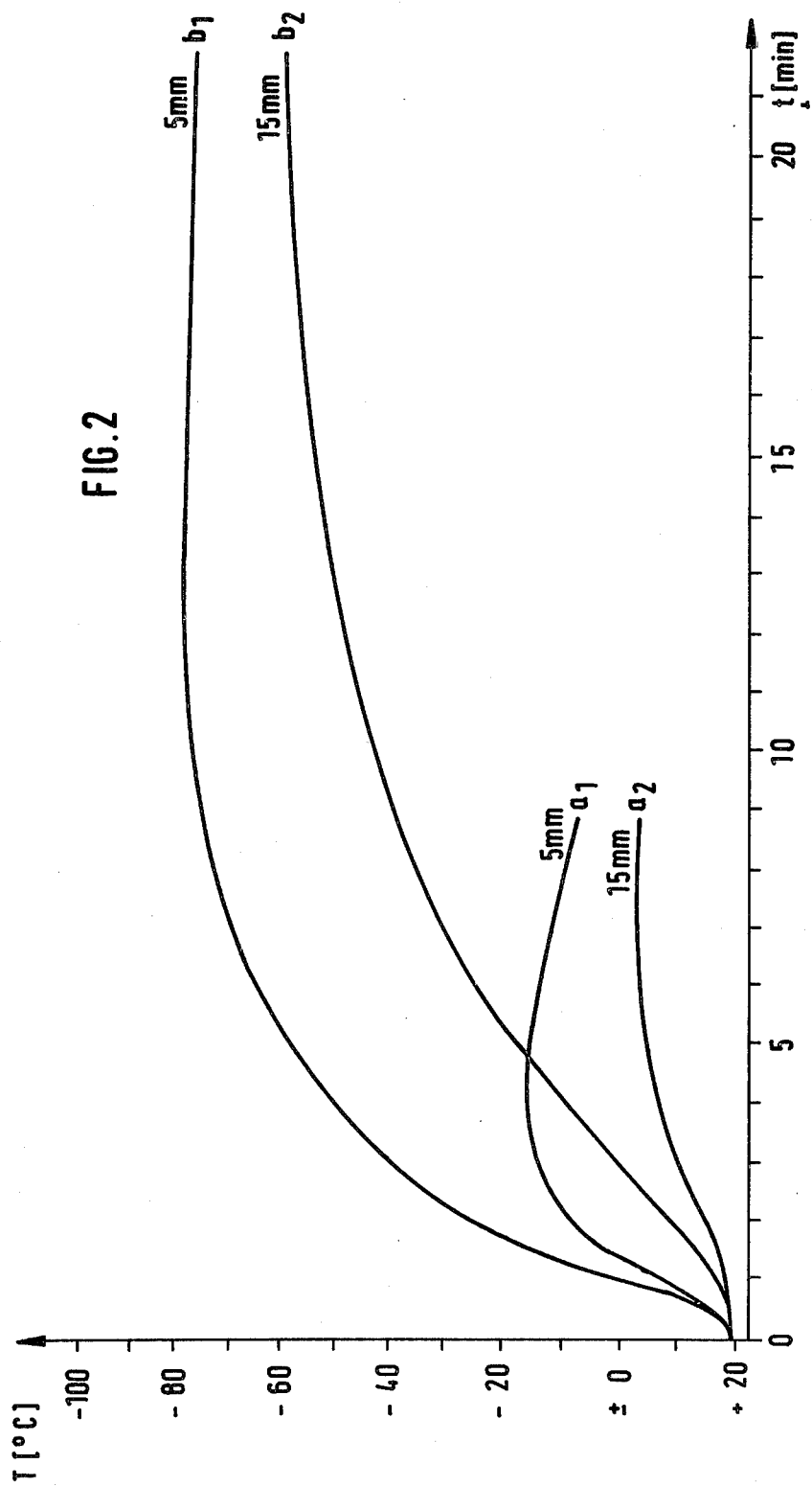

PLASTICALLY DEFORMABLE COOLING AGENT

BACKGROUND OF INVENTION

The invention concerns a plastically deformable cooling agent.

Low boiling liquefied gases, particularly nitrogen, are utilized in many application areas for cooling of materials or for cooling of material surfaces. The low boiling temperature of liquid nitrogen, −196° C., normally causes good heat transmission, and the high evaporation heat of the liquid nitrogen means a great cold storage per unit volume.

The surfaces of objects which cannot be immersed in the low boiling liquefied gas are usually cooled by spraying on the cooling agent. Hereby, the utilization level of the cold capacity of, for instance, liquid nitrogen is low, since only rarely are the surfaces of such a nature that the liquid nitrogen remains by itself on the surface to be cooled. It is particularly difficult to achieve uniform cooling if the surfaces are not horizontal or if they have elevations and recesses.

These occur, for instance, in cryomedicine, in the treatment of warts. Hereby, individual warts are cooled to low temperature by application of a metal rod which has previously been deep-cooled in liquid nitrogen. The low temperatures cause sloughing of the warts. However, this method can no longer be used when larger skin areas are to be treated, e.g., when larger skin areas are invaded by warts. In this case, spraying with liquid nitrogen gives unsatisfactory results.

SUMMARY OF INVENTION

The object of the invention is to create a cooling agent based on liquid nitrogen, which also allows the cooling of irregular surfaces without problems.

According to the invention, this is achieved by means of a plastically deformable cooling agent, consisting of a mixture of liquid nitrogen with at least 8% by weight of fine-grained silica gel.

In a cooling agent of this nature, the nitrogen is stored in liquid form. The cooling agent has the consistency of slush and can contain e.g., up to approximately 50% by weight silica gel. With higher contents of silica gel, the cooling effect is unsatisfactory. A silica gel marketed under the name Aerosil 200 has proven particularly suitable. Aerosil 200 consists of more than 99.8% $SiO_2$, the particle size is 12 nm, the specific surface is 200 $m^2/g$, and the powder density is 50 g/l. Aerosil 200 is manufactured by Degussa of Frankfurt, Germany.

The cooling agent according to the invention can be particularly advantageously used in the form of a cold cushion. For this purpose, the cooling agent is filled into a fine-mesh weave of polyamide. The cold cushion can be drenched with liquid nitrogen as often as desired and can be applied to surfaces of any shape. When the cushion is immersed in liquid nitrogen, the appropriate mix ratio occurs without change of volume, since only the cavities in the silica gel are filled with liquid nitrogen. It is possible to press such a cold cushion onto a surface from below as well. A preferred application area is the cooling of larger skin areas in cryomedicine. This will be explained in greater detail in the following. However, it is evident that the cooling agent according to the invention can also be correspondingly used in any technical area.

THE DRAWINGS

FIG. 2 is a diagram showing the comparison of the cooling effect of a conventional copper rod with the cooling effect of a cooling cushion in cryomedicine.

DETAILED DESCRIPTION

Figure 1:
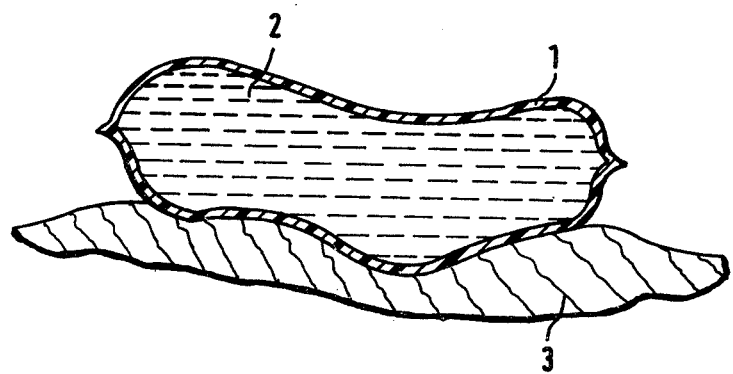
FIG. 1 illustrates the cooling agent in the form of a cold cushion.

The cold cushion illustrated in FIG. 1 consists of a fine-mesh weave 1 of polyamide, in which there is a slush 2 of liquid nitrogen with 8% by weight Aerosil 200. The cold cushion rests on the surface to be treated, a human skin 3, and follows the contours of the skin excellently. The weave 1 has such a fine mesh that the slush of liquid nitrogen and Aerosil 200 cannot penetrate the pores. Only the evaporated gaseous nitrogen can escape from the weave. The cold cushion is in direct contact with the surface to be cooled. No significant gas buffer with potential insulation effect occurs between the cooling agent and the surface. The cold cushion is reusable by renewed immersion in liquid nitrogen after the cold cushion has warmed up. Hereby, it again takes up the full quantity of liquid nitrogen which then penetrates the pores of the polyamide weave.

In order to make a statement concerning the cryogenic characteristics of the cold cushion, freeze tests were performed on silicon rubber in comparison with a conventional copper rod. The temperature progression over time was measured by means of thermoelements at various depths. The test results are shown in FIG. 2. The freezing process at 5 mm depth and at 15 mm depth when a copper rod was used are represented by means of curves $a_1$ and $a_2$. At a depth of 5 mm the temperature minimum obtained after 3.5 minutes was only −16° C. At a depth of 15 mm, the 0° C. limit could no longer be reached. By contrast, when a cold cushion according to the invention was used, −35° C. was reached at 5 mm depth already after 3 minutes, −78° C. after 14 minutes. At a depth of 15 mm, 0° C. was reached after 3 minutes and after 5.5 mm, −20° C. The corresponding curves are identified as $b_1$ and $b_2$ in FIG. 2.

The superior results of the cold cushion according to the invention as compared to the copper rod are certainly not only due to better heat transfer characteristics. With the copper rod, much cold is lost to adjacent areas due to the small freezing cross-section. When large-surface cushions are used, these areas will themselves be supplied with cold from the surface. However, the comparative test shows that those cryogenic temperatures and the cryogenic depth achieved with the copper rod on small surfaces are achieved and exceeded with the cold cushion on large surfaces.

Other plastically deformable storage materials were also studied in the tests, particularly copper granulate. These storage materials as well proved to the superior to the copper rod, but when they were applied, the cryogenic effect of the cooling agent of liquid nitrogen and fine-grained silica gel according to the invention could by far not be achieved.

The cooling agent according to the invention can also be applied in purely technical fields. In cold cushion application, other cover materials can also be used instead of polyamide, e.g., glass wool or rock wool. Cold cushions of such cover material can, if required, be exposed to temperatures to 1000° C. It is possible, without difficulty, to apply the cooling agent, particularly in the form of a cold cushion, to uneven surfaces, side surfaces, or undersides, and to create an almost direct contact between the object to be cooled and the cooling agent.

SUMMARY

Low-boiling liquefied gases, particularly nitrogen, are proven cooling agents to cool materials or parts of materials to low temperatures. Hereby, heat transmission is prevented by Leydenfrost's phenomenon. Additional difficulties occur when the materials cannot be immersed in the low-boiling liquefied gas, but only parts of the surface are acted upon by the cooling agent. Only on horizontal surfaces can a satisfactory cooling effect be achieved without additional aids.

Surfaces with arbitrary contours can be cooled with a cooling agent consisting of a mixture of liquefied nitrogen with at least 8% by weight fine-grain silica gel. Such a mixture is plastically deformable and adjusts to irregular surface contours. The mixture can be used as a cold cushion, whereby it is accommodated in a fine-mesh polyamide weave. Such cold cushions are particularly advantageous in cryomedicine for cooling of large skin areas.

What is claimed is:

1. Plastically deformable cooling agent, consisting of a mixture of liquid nitrogen with at least 8% by weight fine-grained silica gel.

2. Cooling agent according to claim 1, including a cold cushion of fine-mesh polyamide weave filled with the cooling agent.

3. In a method of cooling material surfaces, the improvement being forming a plastically deformable cooling agent consisting of a mixture of liquid nitrogen with at least 8% by weight of fine-grained silica gel, and applying the cooling agent to the surface to be cooled.

4. The method according to claim 3, wherein the cooling agent is applied by means of a cold cushion of fine weave filled with the cooling agent.

* * * * *